United States Patent
Kawabe et al.

[15] 3,689,121
[45] Sept. 5, 1972

[54] APPARATUS FOR CONTROLLING BRAKING FORCE IN A WHEEL BRAKE SYSTEM ON A POWERED VEHICLE

[72] Inventors: Tsuneo Kawabe; Kouichi Suzuki; Hirotaka Miyake, all of c/o Aisin Seiki Kabushiki Kaisha 1, Asahimachi 2-chome, Kariya City, Japan

[22] Filed: Aug. 25, 1970

[21] Appl. No.: 66,775

[30] Foreign Application Priority Data

Aug. 26, 1969 Japan .....................44/67413

[52] U.S. Cl. .......303/21 CH, 188/106 P, 188/181 T, 188/195, 188/346, 188/349, 303/6 C, 303/22 R
[51] Int. Cl. .............................B60t 8/22, B60t 8/26
[58] Field of Search.......188/106 R, 181 T, 195, 346, 188/349; 303/6, 21 CH, 22

[56] References Cited

UNITED STATES PATENTS

| | | | |
|---|---|---|---|
| 3,008,548 | 11/1961 | Moyer | 303/21 CH X |
| 3,305,051 | 2/1967 | Maurice | 188/346 |
| 3,368,651 | 2/1968 | Lepelletier | 188/346 |
| 3,371,754 | 3/1968 | Lepelletier | 303/22 X |
| 3,410,608 | 11/1968 | Cadiou | 303/6 C |
| 3,434,572 | 3/1969 | Lepelletier | 188/346 |

FOREIGN PATENTS OR APPLICATIONS

| | | | |
|---|---|---|---|
| 1,914,336 | 10/1970 | Germany | 188/181 X |

*Primary Examiner*—Milton Buchler
*Assistant Examiner*—Stephen G. Kunin
*Attorney*—Sughrue, Rothwell, Mion, Zinn & Macpeak

[57] ABSTRACT

An improved process and apparatus for controlling the hydraulic brake pressure for actuating the front and rear wheel brakes of an automotive vehicle to prevent simultaneous locking thereof upon sudden application of the vehicle brake actuating pedal by providing a hydraulic pressure limiter in the hydraulic conduit between the brake master cylinder and a selected pair of vehicle wheels, with the hydraulic pressure limiter, in turn, being connected with a brake pressure signal generating device attached to the remaining vehicle wheel pair for controlling the brake applied pressure of the selected wheel pair in response to the braking effort of the other wheel pair. The hydraulic pressure limiter unit is also operatively connected with a member of the vehicle chassis and responsive to the relative movement of the chassis member resulting from the braking action to vary the pressure applied to the selected wheel pair to prevent simultaneous locking of the front and rear vehicle wheels.

7 Claims, 8 Drawings

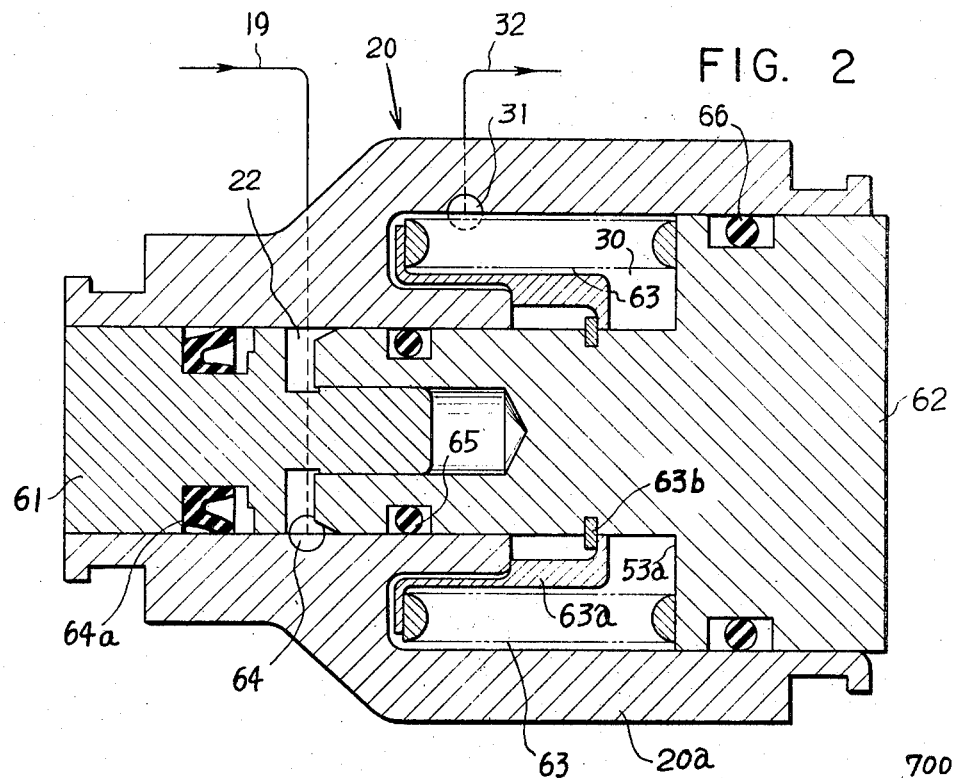
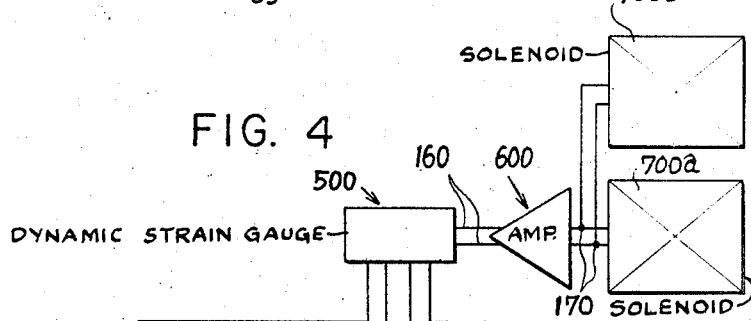
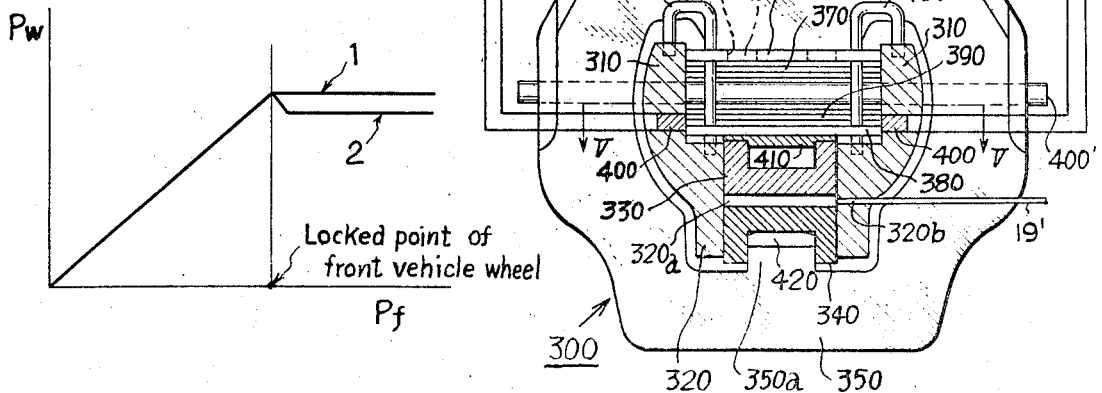

APPARATUS FOR CONTROLLING BRAKING FORCE IN A WHEEL BRAKE SYSTEM ON A POWERED VEHICLE

This invention relates to improvements in and relating to a process and an apparatus for the control of the hydraulic brake pressure in an automotive hydraulic wheel brake system.

In a conventional brake pressure control arrangement in the hydraulic brake system of an automotive vehicle having front and rear wheels, it has already been proposed to provide a front reaction chamber adapted for the generation of a hydraulic reaction pressure in response to the brake force occasionally applied to the front vehicle wheels, said hydraulic reaction pressure being delivered from said chamber directly to the rear wheel brake means for performing a brake action therein.

With such arrangement, it will be frequently observed that upon locking of the front wheel or wheels, the rear wheels are also brought disadvantageously into a locking condition. Such a phenomenon must be naturally avoided from the viewpoint of safety steering of the vehicle.

It is a main object of the invention to provide a method and an apparatus for avoiding simultaneous locking of front and rear wheels of an automotive vehicle upon a sudden and substantial application of an automotive brake.

A further object is to provide an improved braking technique of the above kind, capable of introducing the adhesive factor of traffic road surface conditions into the function of a brake pressure limiter provided in the hydraulic brake system for control of the hydraulic pressure to be applied to the rear wheel brake means. In the broadest meaning of the invention, the expressions of "front" and "rear" can be used in their reversed sense, when viewing the functions and effects of the subject matter.

These and further objects, features and advantages of the invention will become more apparent when read the following detailed description of the invention by reference to the accompanying drawings, in which:

FIG. 2 is an enlarged sectional view of essential parts of a front wheel brake cylinder unit shown only schematically in FIG. 1.

FIG. 4 is a sectional view of a reaction signal generator employed in the foregoing modification, connected with several electrical circuit components shown only in a highly simplified schematic way.

FIG. 8 is a further chart of the operational characteristic of the hydraulic brake system embodying the principles of the invention, wherein, one of the front or rear wheel brake unit has been brought into a locked condition.

Figure 1:
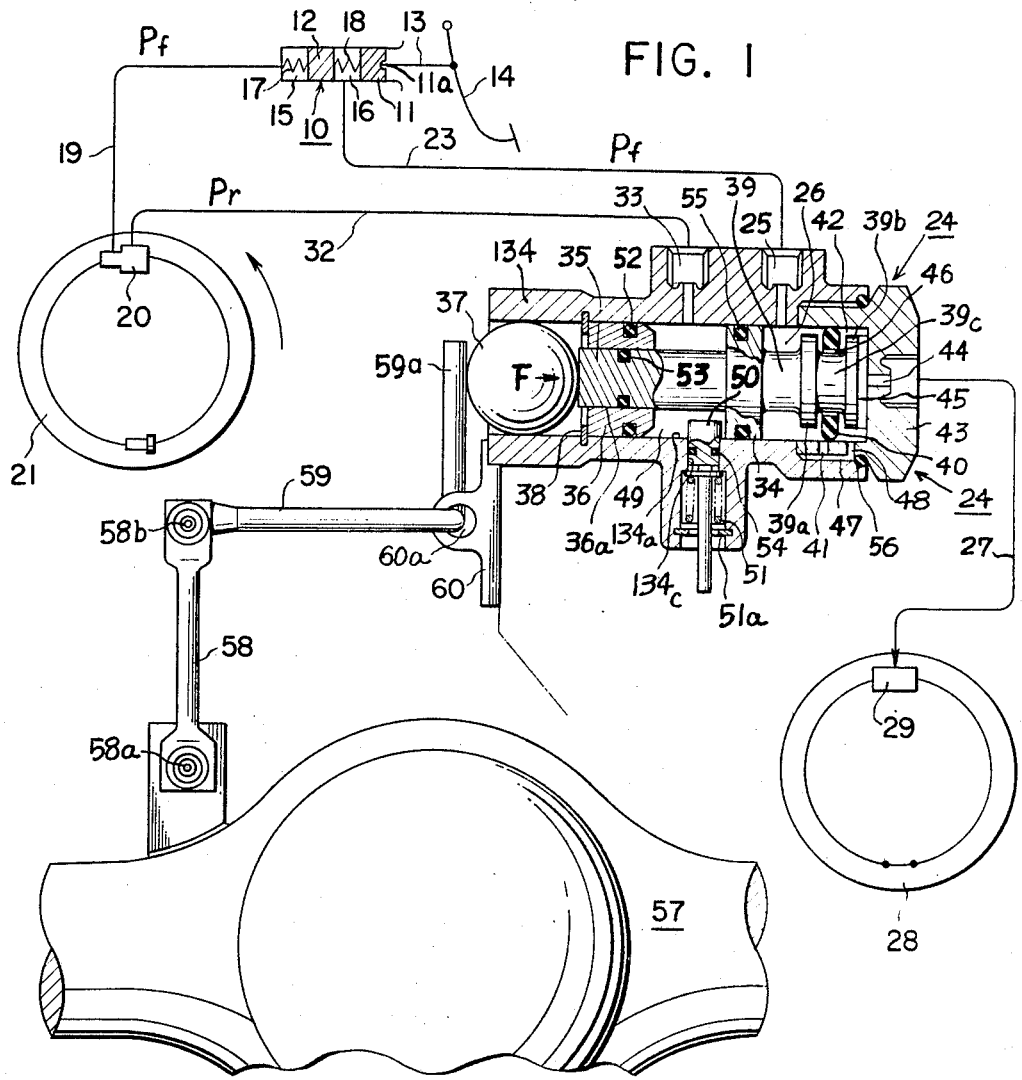
FIG. 1 is a substantially schematic representation, partially in section, of a preferred embodiment of an automotive hydraulic brake system embodying the principles of the invention.

Referring now to FIG. 1 of the accompanying drawings, a first embodiment of the present invention will be described hereinafter in detail.

The numeral 10 denotes generally and schematically a conventional tandem master cylinder containing a pressure piston 11 and an idle piston 12, the former piston 11 having an axial recess 11a formed in its outer end for receiving an inner end of a pusher rod 13 which is linked at its outer end with a conventional manual braking member 14 preferably formed into a brake pedal as shown.

By the provision of these pistons 11 and 12, the interior space of the master cylinder 10 is divided into two separate chambers 15 and 16 which are filled with a hydraulic liquid such as oil. In the chamber 15, there is provided a first return spring 17 which is held under pressure between the related end wall of said cylinder 10 and the outer end of idle piston 12. A second return spring 18 is held in position between the pistons 11 and 12 under pressure.

One of the chambers at 15 is hydraulically connected through a piping 19 to an actuating chamber 22 of a wheel cylinder 20 attached to a front wheel 21 representing two wheels of this kind, not completely shown, of a powered vehicle, not shown, as most clearly seen from FIG. 2, while the remaining chamber 16 is hydraulically connected through a piping 23 to a port 25 of a hydraulic pressure limiter unit 24, said port 25 being connected further through an actuating chamber 26 and a further piping 27 to an actuating chamber, not shown, of a wheel cylinder 29 of a rear wheel 28 of the powered vehicle, said wheel representing again two wheels of this kind, although not specifically shown.

The numeral 30, FIG. 2, denotes a reaction chamber which is hydraulically connected through a port 31 and a piping 32 to a port 33 of the hydraulic pressure limiter 24.

This limiter 24 is fixedly mounted on the chassis or engine room, not shown, on a powered vehicle, although the mounting means have been omitted from the drawing on account of their very popularity.

The limiter comprises a hollow cylinder 134 in the bore 134a of which a piston type plunger 34 is slidably received. The piston-plunger 34 is formed with a reduced cylindrical part 35 extending from the piston part axially in the leftward direction when seen in FIG. 1. A ring-shaped guide member 36 is slidably mounted in the cylinder bore 134a and formed with a concentric axial bore 36a, said reduced part 35 of said piston-plunger extending through the bore opening 36a.

As seen from FIG. 1, the outer end of the reduced part 35 is kept in contact with a ball member 37. The guide member 36 is limited in its leftward sliding movement by a spring retainer 38 which is positively and fixedly mounted in the inside wall surface of the cylinder 134.

The piston-plunger 34 has a further reduced part 39 extending from main piston part 34 in the right-hand axial direction when seen in FIG. 1 and being formed integral with two separate circular collars 39a and 39b. A ring valve member 40 is slidably mounted in the ring groove 39c defined between these circular collars 39a and 39b, said valve being adapted when brought into its operating position for closing a port 41 provided for establishing hydraulic communication between the right-hand bore chamber 26 and a passage 47 to be described.

Valve member 40 is formed with axial grooves 46 in its inside surface for assuring hydraulic communication between the chambers 26 and 42. The right-hand end of the cylinder 134 is closed by a screw plug 43, the right-hand end of piston-plunger 34 abutting normally against the plug.

An axial passage 44 is bored through the plug at its center, the cylinder chamber 42 being kept in fluid communication through radial passage means 45 formed on the right-hand end of piston-plunger 34 and said axial passage 44 with the piping 27. The chambers 26 and 42 are kept in fluid communication with each other through port 41 and passages 47 and 48.

Into the acting chamber 49 of the cylinder 134 a small lateral piston 50 sealingly and slidably projects from a lateral bore 134c bored through the wall of the cylinder 134, said lateral piston 50 being backed up with an urging spring 51 which is held in position in an enlarged part of the lateral bore by means of a spring retainer 51a. Sealing packings 52, 53, 54, 55 and 56 are provided for establishing an effective seal at several places. More specifically, sealing packing 52 is fitted to the slidable guide member 36 for preventing the hydraulic liquid from the chamber 49. For the same purpose, the left-hand reduced part 35 of piston-plunger 34 is fitted with the sealing packing 53 and the lateral piston 50 is fitted the sealing packing 54. The main piston 34 is fitted with the sealing packing 55 serving for the same purpose. The final sealing 56 is provided between the right-hand end of the cylinder 134 and the closure plug 43 for establishing an effective seal therebetween.

Ball member 37 is received in the left-hand end of the cylinder bore 134a in a rollable manner.

An arm 58 is pivotably mounted at its lower end 58a on the differential gear casing 57 of the vehicle, while the upper end of the arm 58 is pivotably connected with a L-shaped arm 59 which is kept in pivotable connection with a part 60 of the vehicle chassis. The upright portion 59a of the L-shaped arm 59 is kept in pressure engagement with the ball member 37.

Next, referring to FIG. 2, the front wheel cylinder unit 20 will be described in detail.

This unit 20 is fixedly mounted on the conventional backing plate, not shown, and comprises a cylinder 20a which houses slidably a male piston 61 and a female piston 62 cooperating with each other as shown. By the provisions of these cooperating pistons, the interior space of the cylinder 20a is divided into the acting chamber 22 and the reaction chamber 30. Within the latter chamber 30, there is provided a return spring 63 which abuts with its one end against piston 62, while the opposite end of the return spring abuts against a retainer 63a held stationary in position at 63b.

The former chamber 22 is formed with the port 64 which is hydraulically connected with the master cylinder 10, as referred to hereinbefore. Sealing packings 64a, 65 and 66 are also provided for providing effective seal between male piston 61 and cylinder 20a; and female piston 62 and cylinder 20a, respectively. Although not specifically shown, the left-hand end of male piston 61 is kept in operative engagement with a first brake shoe and the right-hand end of female piston 62 is kept in operative engagement with a second brake shoe of a conventional expandable type brake shoe unit.

The operation of the first embodiment so far shown and described is as follows:

When the driver of the vehicle depresses brake pedal 14 during travel of the vehicle, pistons 11 and 12 will be shifted leftwards in FIG. 1 against the action of springs 17 and 18, the hydraulic liquid prevailing in the chambers 15 and 16 being pressurized correspondingly. The thus pressurized liquid such as oil is delivered from the chamber 16 through piping 23 and port 25 to the acting chamber 26, thence through axial grooves 46, axial passage 44 in the pressure limiter 24 and further through piping 27 to rear wheel cylinder 29. At this stage, the piston 34 is hydraulically urged to move leftwards in FIG. 2. When assuming that the vehicle is travelling in its advancing direction and the wheels are rotating in the direction shown by a small arrow X shown in FIG. 1, the pressurized hydraulic liquid in the acting chamber 15 will be conveyed therefrom through piping 19 to the pressure chamber 22 of the front wheel cylinder unit 20 which is thus brought into its energized position for exerting a braking action. In this way, the front wheel is subjected to a braking effort. As easily seen from the foregoing, a hydraulic reaction called the brake anchor reaction is accumulated in the reaction chamber 30, the thus pressurized hydraulic liquid being conveyed therefrom through port 31 and piping 32 to chamber 49, so as to increase the hydraulic pressure prevailing therein. In this way, the hydraulic pressure force acting upon the lateral piston 50 is increased and the latter is forcibly shifted downwards in FIG. 1 against the action of return spring 51. A rightwardly directing hydraulic pressure is thus applied to a differential piston area which is equal to the cross-section of the piston part 34 minus that of the reduced portion 35.

The part of the vehicle load carried by the chassis will tend to reduce the distance between the latter and the differential gear casing 57 so that the L-shaped lever 59 is subjected to a certain amount of clockwise turning moment about its intermediate pivot at 60a, thereby its upright arm 59a urging to apply a rightwardly directing mechanical pressure through ball member 37 to the piston-plunger 34.

According to direction and amount of the resultant of these three forces, the valve member 40 held between the collars 39a and 39b will on-off control the hydraulic communication between the chambers 26 and 42, as well as the fluid passage through port 41. In this way, the hydraulic pressure of rear wheel cylinder unit 29 is controlled by the pressure increase occasionally appearing in the reaction chamber 30, as will become more clear when reading the following mathematical analysis.

Now assuming that the piston valve 40 is positioned as shown in FIG. 1 wherein the chambers 26 and 42 are kept in fluid communication with each other, then:

$$F_f = P_w$$

where, $P_f$ stands for the hydraulic pressure in master cylinder;

$P_w$ denotes the hydraulic rear wheel brake pressure;

When viewing the balanced conditions of the piston-plunger 34 ready for initiating a motion reverse thereof, the following equation will be established.

$$F + (S-s)P_r = SP_w$$

Figure 7:
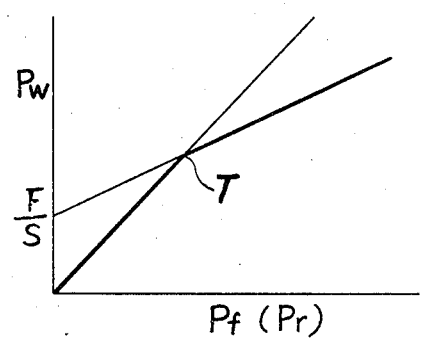
FIG. 7 is a chart showing the operating characteristic of the arrangement embodying the principles of the invention.

Thus, $$P_w = \frac{S-s}{S} P_r + \frac{F}{S}$$

$$P_r = M_b \cdot P_f$$

where, $F$ stands for vehicle weight sensing or responding force;

$S$ denotes the cross-sectional area of piston part 34;

$s$ stands for the cross-sectional area of reduced part 35;

$P_r$ denotes front reaction pressure;

$M_b$ denotes the equivalent coefficient of front brake efficiency;

A sample of pressure increase of these variables is shown in FIG. 7.

When observing the brake force distribution between the front wheel group and the rear wheel group, the point of transition T of the pressure rising characteristic curve $P_f - P_w$ and the slope of the curve in front of this point varies with variation of the front brake effectiveness, thereby the correction being made nearly at the designed valves which represents a substantial progress in the art. $F$ stands the vehicle load-responding force which serves for performing the brake force distribution used in the above sense, in an optimum way, irrespective of the occasional loading conditions of the vehicle.

When it is now assumed that a braking effort is applied to the front wheel group of the vehicle higher than that corresponding to the occasional adhesive force acting between the wheel group and the traffic surface, there appears a front wheel lock, and it will be seen that the brake reaction pressure prevailing at this stage in the secondary chamber 30 of front wheel cylinder will be reduced to that which corresponds to the adhesive force. Just at this moment, the balanced or equilibrium conditions relative to the piston-plunger unit 34 is instantly broken, thereby the latter being caused to shift leftwards in FIG. 1 and the sealing means at 40 being shifted leftwards across the port 41. In this way, the hydraulic rear brake pressure $P_w$ becomes independent of the pressure chamber 26 and thus, the hydraulic pressure $P_w$ will be modified in accordance with the occasional road adhesive force as expressed herein by the front brake reaction force.

Even with an increased manual pressure implied upon the brake pedal 14 after bringing the front wheel or wheels into a locked condition, the rear brake applying pressure $P_w$ can be maintained substantially at a constant valve, on account of the fact that at this stage, the front brake reaction pressure $P_r$ is determined exclusively by the occasional road adhesion force. By the thus modified balance between the front and the rear wheel braking force, an undesired locking of the rear wheel or wheels can be positively obviated. This operational condition may well be supposed by reference to FIG. 8. In this figure, the curve at "1" represents an example of the condition where a wheel lock appears during rise of the hydraulic pressure relative to the same adhesive condition of the traffic road, while the curve at "2" represents the condition where the vehicle has passed from a high adhesive traffic road to a low adhesive one.

In case of a backward running of the vehicle, or in case of a broken piping at 32, FIG. 1, there will appear no reaction pressure, and thus the lateral piston 50 will be maintained at the shown position under the spring force at 51. Therefore, a leftward shift of the plunger-piston 34 is blocked. In this case, the rear wheel brake will be actuated always under such pressure condition as:

$$P_f = P_w$$

Referring to further drawings, a modification from the foregoing will be described in detail hereinafter.

Figure 3:
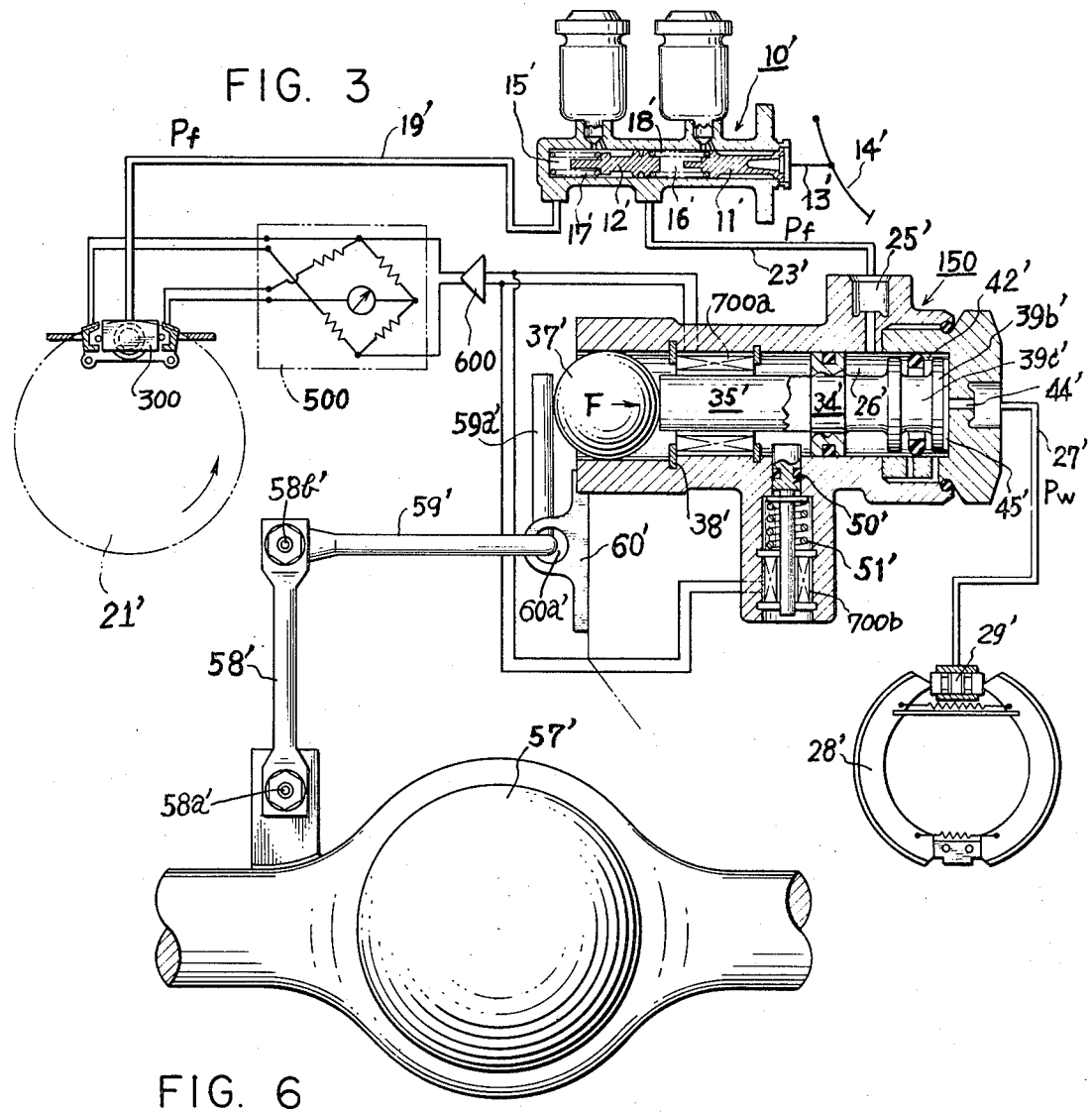
FIG. 3 is a similar view to FIG. 1, showing a modified hydraulic brake system wherein the hydraulic brake reaction signal is provided in the form of an electrical voltage in place of a hydraulic pressure used in the foregoing embodiment.
Figure 6:
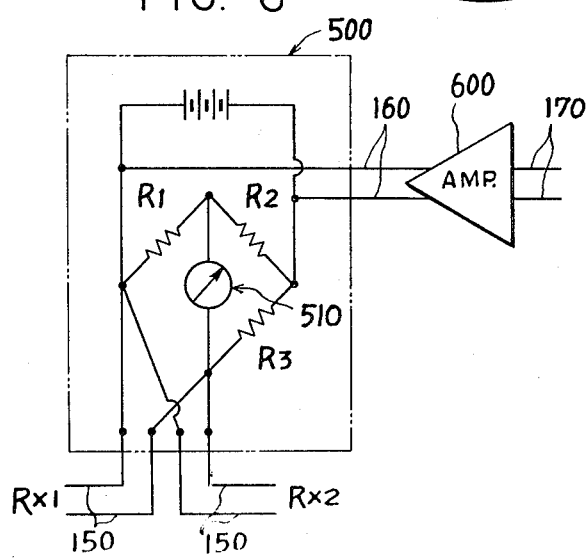
FIG. 6 is a detailed wiring diagram of a dynamic strain gauge shown only schematically in FIG. 4.

In FIG. 3, a conventional master cylinder 10' which is similar to that shown at 10 in the foregoing is arranged as before, to be controlled by a brake pedal 14' through a pusher rod 13'. A conventional disc brake unit 300 for a front vehicle wheel 21' is hydraulically connected through a piping 19' to the master cylinder 10'. Disc brake unit 300 is fitted with two torque-receiving arms 310 carrying respective load gauges 400 which are electrically connected through leads 150 to dynamic strain gauge 500 of the conventional design. This strain gauge 500 is connected through leads 160 to an amplifier 600 which is again of the conventional design, the latter being further connected through leads 170 to two solenoids 700a and 700b which are arranged in parallel to each other and mounted in a hydraulic pressure limiter 150 which is hydraulically connected through a piping 23' with the master cylinder as before.

The disc brake unit 300 comprises a cylinder 320 which is fixedly mounted on a conventional vehicle chassis and contains therein two opposed pistons 330 and 340. At the outer end of piston 340, a tongue portion 350a of a closed ring-shaped plate 350 is kept in engagement therewith through a thrust member 420, thereby said plate 350 being shiftable relative to said cylinder 320 and in unison with the piston 340. The piston 330 is kept in engagement with a block member 410 so as to minimize friction with a backing plate 380 on which pads 390 are fixedly attached. Pads 370 are fixed on a backing plate 360 having grooves 360a kept in engagement with projections 350b formed on the plate 350. Through these pads 370 and 390, the main parts of two U-shaped guide pins 430 penetrate, the outer or shorter ends of these pins being kept in engagement, as shown in dotted lines in FIG. 4, with the respective torque-receiving arms 310 made rigid with the cylinder 320, thereby allowing these pads to move in the peripheral direction to a certain limited degree. When the pistons 330 and 340 are brought into actuation as will be described hereinafter, a disc 400' is squeezed between and by the pads 370 and 390.

Figure 5:
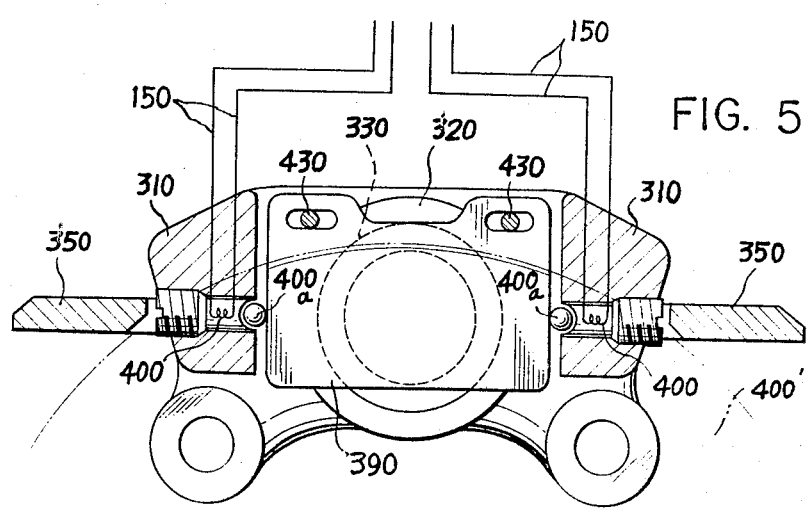
FIG. 5 is a cross-section of the reaction signal generator taken substantially along a section line V—V in FIG. 4.

The load gauges 400 consist, for instance, of respective conventional resistance type strain gauges which are arranged within the arms 310 so as to receive braking torque through balls 400a from pads 390 as may be most clearly seen from FIG. 5. It will be seen that with such arrangement, the strain gauges 400 will be subjected to strain in accordance with occasionally applied braking torque.

The disc brake unit 300 is so designed and arranged that when pressurized oil appearing upon actuation of brake pedal 14' is delivered from master cylinder 10' as before through the piping 19' and a port 320b to pressure oil chamber 320a, the pistons 330 and 340 are oppositely and outwardly moved from each other, thereby pad groups 370 and 390 are brought from the both sides into pressure contact with the disc 400' for the generation of the required braking force. The thus applied braking torque is transmitted from the disc 400' through pads 390 and balls 400a to the load gauges 400.

The dynamic strain gauge 500 comprises substantially a conventional Wheatstone bridge which is so arranged that it senses variations of electric resistance values $R_{x1}$ and $R_{x2}$ in the load gauges 400, respectively, so as to deliver them to the amplifier 600, for obtaining an electrical voltage corresponding to the braking torque appearing in the disc brake unit 300.

The bridge is normally so adjusted that with the disc brake unit 300 non-operated, no current will flow through leads 160 by observing resistance values $R_1$, $R_2$, $R_3$, $R_{x1}$ and $R_{x2}$ at galvanometer 510.

With application of a voltage amplified at the amplifier 600 to solenoids 700a and 700b, main piston 35' and lateral piston 50' are correspondingly urged to move in their respective acting and retiring directions, respectively, as seen in FIG. 3. In other words, solenoid 700a is effective for conversion of the brake torque at the disc brake unit 300 through load gauges 400, dynamic strain gauge 500 and amplifier 600 into a corresponding urging force applied to the main piston 35'. Further structure and function of the present modification are substantially similar to those of the foregoing embodiment, if not otherwise noted.

In the aforementioned automotive hydraulic brake system, an application of a foot pressure on the pedal 14', pistons 11' and 12' of master cylinder 10' are actuated as before and pressurized oil is delivered therefrom through piping 19' to oil chamber 320a of disc brake unit 300, so as to actuate the pistons 330 and 340 in their pressurizing directions. The pressurized oil conveyed from the master cylinder 10' through piping 23' will perform the same function as before.

With the piston 330 pressurized in the above mentioned way, pressure is transmitted therefrom through block member 410, backing plate 380 and pads 390 to disc 400 which rotates in unison with the related vehicle wheel 21', thereby applying these pads against the disc with pressure. At the same time, pressure is transmitted from piston 340 through thrust member 420, tongue projection 350a, closed ring plate 350 and backing plate 360 to pads 370 which are thus applied again to the rotating disc 400' from the opposite side. In this way, a braking force is applied to the wheel 21'.

The braking torque applied to the pads 390 is transmitted through balls 400a to load gauges 400, the electric resistance $R_{x1}$ therein being subjected thereby to a modification. As was referred to hereinbefore, a voltage corresponding to the braking torque is applied through dynamic strain gauge 500 and amplifier 600 to solenoids 700a and 700b, thereby the main piston 34' and 50' being actuated. It will be seen from the foregoing that in the present modified arrangement, the hydraulic pressure used in the foregoing embodiment has been replaced by the electromagnetic force. Thus, the characteristic curves are similar to those shown in FIG. 7.

When the vehicle wheel or the disc 400' therewith should become nearly locked, the braking torque being applied to the load gauges 400 will become suddenly smaller irrespective of the hydraulic pressure prevailing in the master cylinder 10'. Then, the electromagnetic force as applied to the solenoids 700a and 700b will become smaller correspondingly, and the main piston 34' will shift leftwards, while the lateral or auxiliary piston 50' remains in its retarded position. These operating conditions are same as those shown in FIG. 8 in connection with the foregoing embodiment.

It will be thus seen from the foregoing that according to the principles of the present invention, the front brake road reaction is firstly sensed during a braking stroke, and the rear brake is controlled in response to the thus sensed reaction. When the front brake is brought into locked condition, the rear brake receives always an input which corresponds to the occasional adhesive force of the traffic surface. When comparing the novel arrangement embodying the above principles with the comparative conventional one, the freedom of choice of the sensing and controlling process is greatly increased. In addition, the necessary quantity of the hydraulic liquid used for the rear brake may be correspondingly reduced and the adaptability of the improved kind of hydraulic brake system to common and popular size automotive vehicles can be substantially increased.

With failure of the front reaction circuit in the conventional hydraulic brake system, the rear brake will become disabled which means a dangerous operating condition of the automotive vehicle. With use of the presently improved brake system, however, the rear brake can operate in a safe normal manner.

Further, the rear brake can operate even in the case of a rearward running of the vehicle.

Even with the front wheel locked, the rear wheel can be relieved from its possible locking. In addition, the presently improved system can provides the effects of the conventional P.C.V. - and the L.S.V. units commonly used in the modernized automotive hydraulic brake systems.

What we claim is:

1. A brake pressure limiting system for controlling the braking force of a first set of vehicle wheel brakes in response to a brake reaction force of a second set of vehicle wheel brakes comprising in combination:

a hydraulic master cylinder assembly for applying a hydraulic braking pressure to said first and second sets of vehicle wheel brakes in response to actuation by a vehicle operator, first conduit means hydraulically connecting said master cylinder assembly with hydraulic actuating means of said first set of vehicle wheel brakes, second conduit means hydraulically connecting said master cylinder assembly with hydraulic actuating means of said second set of vehicle wheel brakes, a hydraulic pressure limiter assembly connected in said first conduit means between said master cylinder assembly and said hydraulic actuating means of said first set of vehicle wheel brakes, said pressure limiter assembly including a housing rigidly mounted on a suspended portion of said vehicle, said housing having a cylindrical bore therein slidably containing a piston means, said piston means forming a first and a second chamber in said bore, said first chamber communicating with said master cylinder assembly and said second chamber communicating with the hydraulic actuating means of said first vehicle wheel brakes, passage means communicating said first chamber with said second chamber, said piston means having a valve means for controlling hydraulic communication between said first and second chamber in response to the position of said piston means, brake force reaction means operatively connected to said second set of vehicle wheel brakes for generating a signal in response to an increase in the brake reaction force on said second set of vehicle wheels, said hydraulic pressure limiter assembly being operatively connected with said brake force reaction means for controlling the movement of said piston means in response to said signal, said valve means being moved in the direction of said first chamber by said piston means in response to a decrease in the signal from said brake force reaction means to block communication of said master cylinder assembly with the hydraulic actuating means of said first set of vehicle wheel brakes, whereby, upon an impending locking condition of said second set of vehicle brakes, the hydraulic pressure applied to said first set of vehicle brakes is reduced to prevent said first set of vehicle wheel brakes from becoming locked.

2. A brake pressure limiting system as defined in claim 1 wherein said brake force reaction means comprises a hydraulic piston and cylinder assembly operatively connected to said second set of vehicle wheel brakes for generating a hydraulic pressure in response to an increase in the brake reaction force on said second set of vehicle wheel brakes, and third conduit means hydraulically communicating said hydraulic piston and cylinder assembly with said pressure limiter assembly, said piston means of said hydraulic pressure limiter assembly being moved in the direction of said second chamber in response to an increase in the pressure from said third conduit means to maintain said valve means in its open position, said valve means being moved to its closed position by the application of hydraulic pressure from said master cylinder upon the decrease in hydraulic pressure in said third conduit means.

3. A brake pressure limiter system as defined in claim 1 wherein said brake force reaction means comprises means for generating an electrical signal in response to an increase in the brake reaction force of said second set of vehicle wheel brakes, and electrically actuated solenoid means operatively connected to said pressure limiter means for maintaining said piston means in the direction of said second chamber, said electrically actuated solenoid means being operatively connected to said electrical signal generating means and actuated thereby.

4. A pressure limiting system as defined in claim 1 further comprising check means for maintaining said valve means in its open position to communicate said first chamber with said second chamber upon the failure of application of said brake reaction signal from said brake force reaction means, said check means comprising an auxiliary laterally movable piston contained in a lateral bore formed in said housing, said auxiliary lateral piston being moved radially outwardly from said piston means upon the application of said signal from said brake force reaction means to said hydraulic pressure limiter assembly.

5. A brake pressure limited system as defined in claim 4 wherein said check means is movable between its operating and off-service positions during the sliding movement of said piston means, wherein when said check means is maintained in its operating position the sliding movement of said piston means in a direction away from said second chamber is prevented and hydraulic pressure is communicated between said first and second chambers to said hydraulic actuating means of said first set of vehicle wheel brakes without being subjected to modification, and when said check means is maintained in its non-service position said piston means is slidable in the direction away from said second chamber to cause said valve means to block communication through said passage means, whereby the master cylinder pressure applied to said first set of vehicle wheel brakes is reduced at a predetermined ratio to provide a properly controlled hydraulic pressure to be delivered thereto.

6. A brake pressure limiter system as defined in claim 1 further comprising vehicle load responsive means operatively connected to said piston means of said hydraulic pressure limiter assembly to move said piston means in the direction of said second chamber in response to an increase in the load of said vehicle, whereby said hydraulic brake pressure applied to said first set of vehicle wheel brakes is modified in accordance with the loading conditions of the vehicle.

7. A brake pressure limiter system as defined in claim 6 wherein said vehicle load responsive means comprises a mechanical linkage operatively connected between said piston means and an unsprung portion of said vehicle, said mechanical linkage changing the position of said piston means in response to a change in the distance between the suspended portion of the vehicle to which said hydraulic pressure limiter assembly is mounted and the unsprung portion to which said mechanical linkage is connected.

* * * * *